United States Patent [19]

Nortey

[11] Patent Number: 4,834,543
[45] Date of Patent: May 30, 1989

[54] OPTIMIZED FOUR-WING, NON-INTERMESHING ROTORS FOR SYNCHRONOUS DRIVE AT OPTIMUM PHASE RELATION IN INTERNAL BATCH MIXING MACHINES

[75] Inventor: Narku O. Nortey, Trumbull, Conn.

[73] Assignee: Farrel Corporation, Ansonia, Conn.

[21] Appl. No.: 180,779

[22] Filed: Apr. 12, 1988

[51] Int. Cl.$^4$ .......................... B28C 1/16; B29B 1/06
[52] U.S. Cl. ....................................... 366/97; 366/297
[58] Field of Search ................ 366/83, 84, 96, 97, 366/297, 298, 299, 300, 301; 425/207, 208, 209, 205, 204

[56] References Cited

U.S. PATENT DOCUMENTS

| | | | |
|---|---|---|---|
| 1,200,070 | 10/1916 | Banbury . | |
| 3,610,585 | 10/1951 | MacLeod | 366/149 |
| 4,284,358 | 8/1981 | Sato | 366/97 |
| 4,300,838 | 11/1981 | Sato | 366/97 |
| 4,714,350 | 12/1987 | Nortey | 366/84 |
| 4,718,771 | 1/1988 | Asai | 366/300 |
| 4,744,668 | 5/1988 | Nortey | 366/76 |

Primary Examiner—Robert W. Jenkins
Attorney, Agent, or Firm—Parmelee, Bollinger & Bramblett

[57] ABSTRACT

Four-wing, non-intermeshing rotors are optimized for synchronous rotation to be driven by synchronous drive means at a constant 180° phase angle, there being two long wings and two short wings on each rotor. A first long wing and first short wing originate at a first end of each rotor, and a second long wing and second short wing originate at the second end of each rotor, the helix angle "A" being the same for all wings on both rotors, and being in the range from about 10° to about 50°. The axial length $l_1$ is the same for all long wings, the axial length $l_2$ also being the same for all short wings. Each rotor has a transition zone opening between the termination of a short wing and the termination of the next succeeding long wing relative to the direction of rotation, the next succeeding long wing originating at the opposite end of the rotor from the short wing. Thus, there are two transition zone openings on each rotor, and all four of the transition zone openings are the same; that is: $Q_1 = Q_2 = Q_3 = Q_4$. The axial and rotational forces are the same for all the long wings. Also, the axial and rotational forces are the same for all the short wings. The axial forces on each rotor advantageously are balanced as well as the rotational and axial forces of both rotors.

16 Claims, 7 Drawing Sheets $F_{1A}$ = LONG WING AXIAL FORCE
$F_{1R}$ = LONG WING ROTATIONAL FORCE
$F_{2A}$ = SHORT WING AXIAL FORCE
$F_{2R}$ = SHORT WING ROTATIONAL FORCE

ASSUMPTION: THE INTERACTION EFFECTS OF THE TWO ROTORS ARE NEGLECTED.

1) SUMMATION OF FORCES: LEFT WINGS
$\sum F_A = F_{1A} - F_{1A} + F_{2A} - F_{2A} = 0$ (BALANCED)
$\sum F_R = 2F_{1R} + 2F_{2R}$ 2) SUMMATION OF FORCES: RIGHT WINGS
$\sum F_A = F_{1A} - F_{1A} + F_{2A} - F_{2A} = 0$ (BALANCED)
$\sum F_R = -2F_{1R} - 2F_{2R}$ 3) SUMMATION OF FORCES: BOTH ROTORS
$\sum F_A = 0 - 0 = 0$ (BALANCED)
$\sum F_R = 2F_{1R} + 2F_{2R} - 2F_{1R} - 2F_{2R} = 0$ (BALANCED)

AXIAL AND ROTATIONAL FORCES EXERTED BY WINGS ON MATERIAL

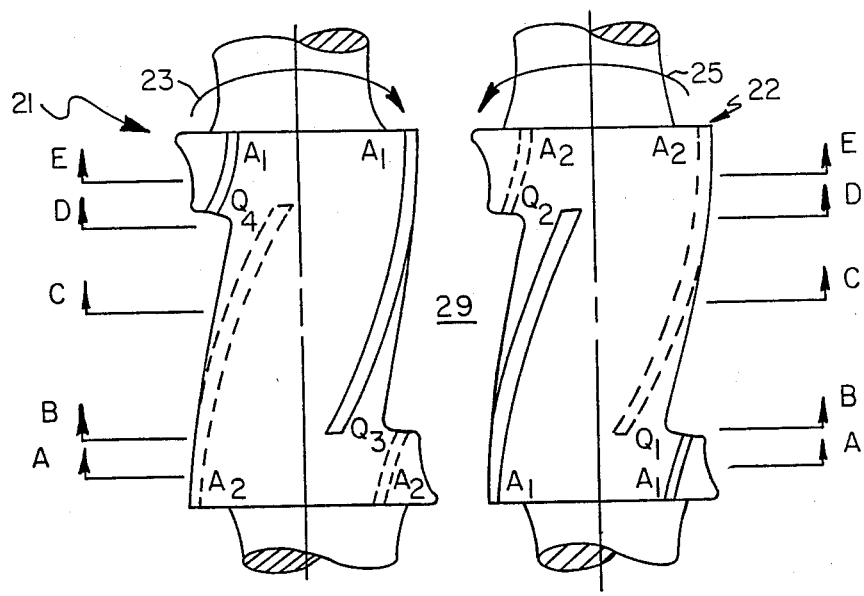

$A_1 \neq A_2, Q_1 \neq Q_2, Q_3 \neq Q_4, Q_1 = Q_4, Q_2 = Q_3$ (PRIOR ART)

| REGION | AVERAGE SHEAR STRAIN RATE | | |
|---|---|---|---|
| | RIGHT ROTOR | LEFT ROTOR | BOTH ROTORS |
| FIRST END SECTION A-A | $\frac{\pi \bar{D} N}{\delta} \cos A_1$ | $\frac{\pi \bar{D} N}{\delta} \cos A_2$ | $\frac{\pi \bar{D} N}{2\delta}(\cos A_1 + \cos A_2)$ |
| MIDDLE SECTION C-C | $\frac{\pi \bar{D} N}{2\delta}(\cos A_1 + \cos A_2)$ | $\frac{\pi \bar{D} N}{2\delta}(\cos A_1 + \cos A_2)$ | $\frac{\pi \bar{D} N}{2\delta}(\cos A_1 + \cos A_2)$ |
| SECOND END SECTION E-E | $\frac{\pi \bar{D} N}{\delta} \cos A_2$ | $\frac{\pi \bar{D} N}{\delta} \cos A_1$ | $\frac{\pi \bar{D} N}{2\delta}(\cos A_1 + \cos A_2)$ |

FIG. 6C  $A_1 = A_2, Q_1 = Q_2 = Q_3 = Q_4$

| REGION | AVERAGE SHEAR STRAIN RATE | | |
|---|---|---|---|
| | RIGHT ROTOR | LEFT ROTOR | BOTH ROTORS |
| FIRST END SECTION A-A | $\frac{\pi \bar{D} N}{\delta} \cos A_1$ | $\frac{\pi \bar{D} N}{\delta} \cos A_1$ | $\frac{\pi \bar{D} N}{\delta} \cos A_1$ |
| MIDDLE SECTION C-C | $\frac{\pi \bar{D} N}{\delta} \cos A_1$ | $\frac{\pi \bar{D} N}{\delta} \cos A_1$ | $\frac{\pi \bar{D} N}{\delta} \cos A_1$ |
| SECOND END SECTION E-E | $\frac{\pi \bar{D} N}{\delta} \cos A_1$ | $\frac{\pi \bar{D} N}{\delta} \cos A_1$ | $\frac{\pi \bar{D} N}{\delta} \cos A_1$ |

WHERE  $\bar{D}$ = ROTOR MEAN DIAMETER
N = SPEED
$\delta$ = ROTOR TIP CLEARANCE
A = HELIX ANGLE

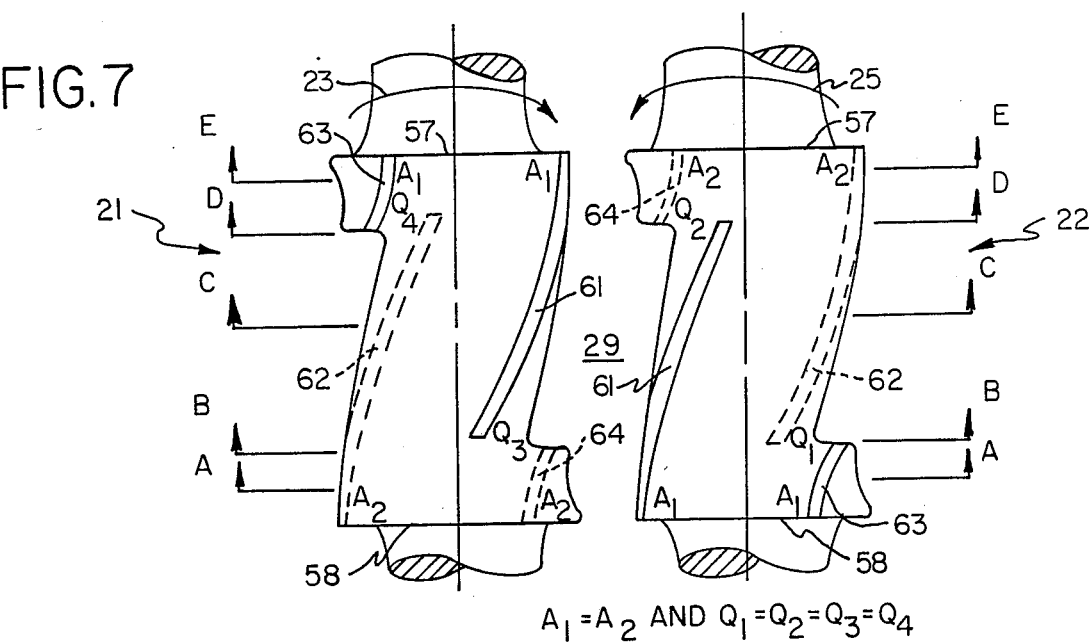
FIG. 7
$A_1 = A_2$ AND $Q_1 = Q_2 = Q_3 = Q_4$
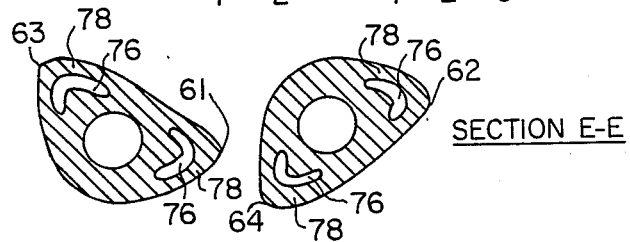
FIG. 7A — SECTION E-E
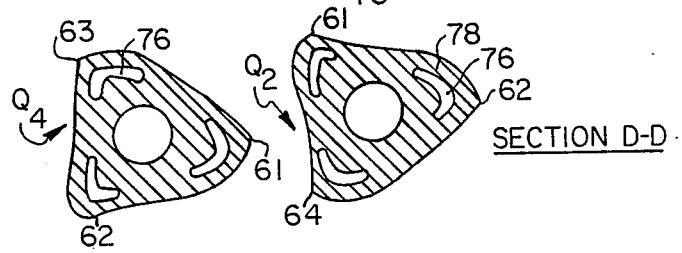
FIG. 7B — SECTION D-D
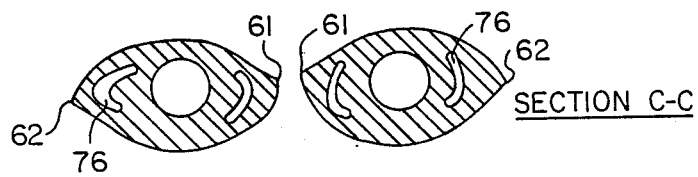
FIG. 7C — SECTION C-C
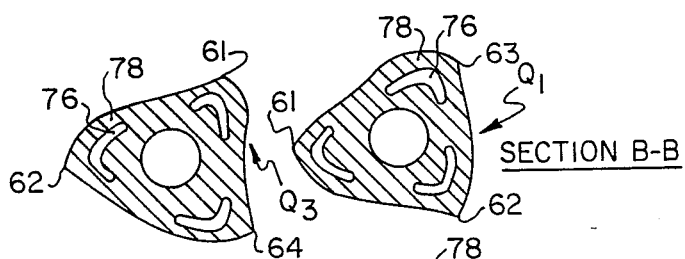
FIG. 7D — SECTION B-B
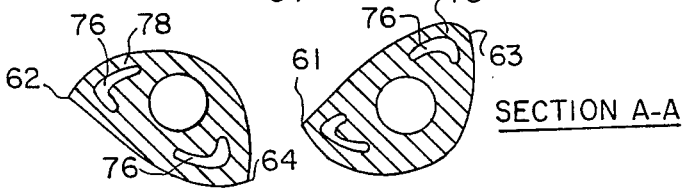
FIG. 7E — SECTION A-A

DIAGONALLY SYMMETRIC FLOW PATTERNS IN THE ROLLING BANKS OF THE MATERIAL

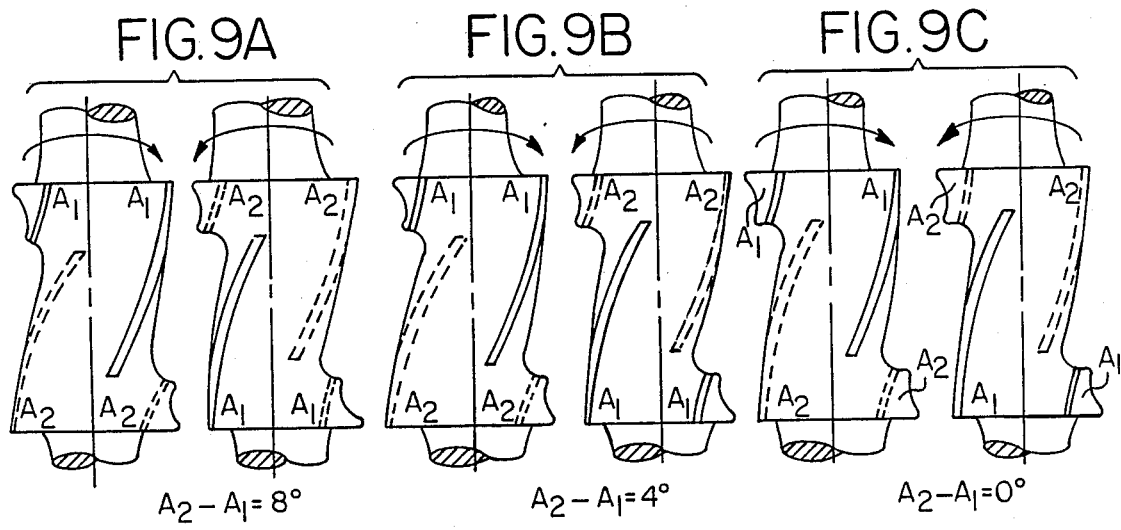
FIG. 9A $A_2-A_1=8°$
FIG. 9B $A_2-A_1=4°$
FIG. 9C $A_2-A_1=0°$
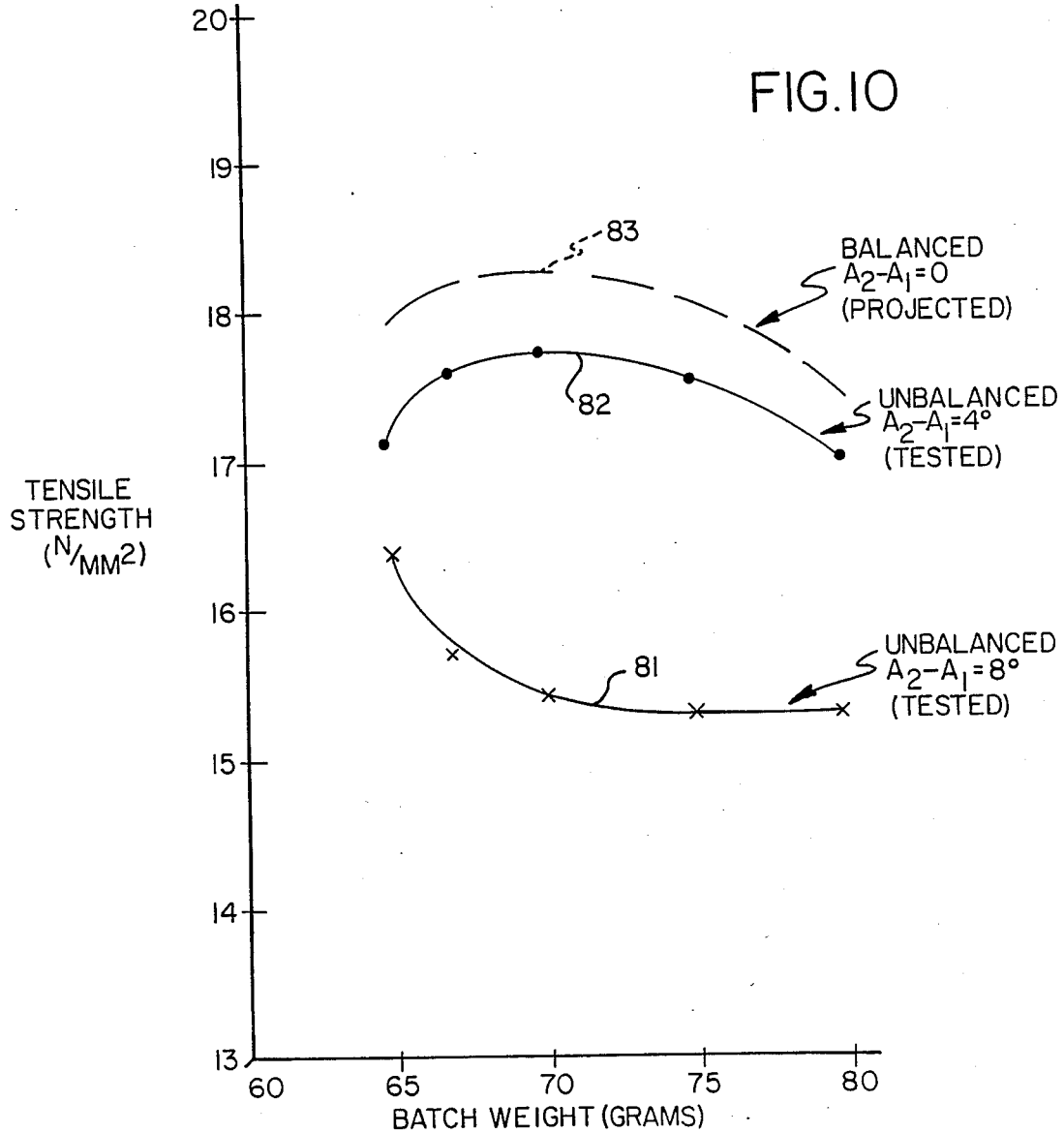
FIG. 10
TENSILE RESULTS OF ONE-STEP MIXING USING NATURAL RUBBER FOMULATION

OPTIMIZED FOUR-WING, NON-INTERMESHING ROTORS FOR SYNCHRONOUS DRIVE AT OPTIMUM PHASE RELATION IN INTERNAL BATCH MIXING MACHINES

BACKGROUND

This invention relates to high intensity internal mixing machines of the batch type having a mixing chamber shaped to accommodate two counter-rotating non-intermeshing winged rotors. The batch of ingredients to be mixed into a homogeneous mass is fed down into the mixing chamber through a vertical chute and is pushed down under pressure by a ram located in the chute. This ram is hydraulically or pneumatically driven. The lower face of the ram, when advanced down to its operating position during mixing of the batch, forms an upper portion of the mixing chamber. The homogeneous mixture produced is removed from the mixing chamber through a discharge opening at the bottom of the chamber, and a door associated with this opening is then closed in readiness for the next batch of ingredients to be introduced down through the chute.

Some internal batch mixing machines are designed with non-intermeshing rotors, and others have intermeshing rotors. Intermeshing rotors must always be driven at the same rotational speed in synchronized relationship; non-intermeshing rotors may be driven at the same rotational speed or at different rotational speeds for achieving different mixing an kneading effects. The present invention relates to the non-intermeshing type. The wings of the rotors have a generally helical configuration, and they produce high intensity mixing and homogenization by the co-operative interaction of their various forceful dynamic effects, as described later. For further information about such internal batch mixers, having non-intermeshing rotors, reference may be made to U.S. Pat. Nos. 1,200,070 and 3,610,585, assigned to predecessors of the present assignees and to recent U.S. Pat. No. 4,714,350, in my name as inventor, and the disclosures of these patents are incorporated herein by reference as background information.

The vast majority, probably more than ninety-five percent (95%), of all internal batch mixing machines in commercial usage today in the United States having non-intermeshing rotors are operated non-synchronously, i.e. with the rotors being driven at different rotational speeds, often called "friction ratio" operating mode. For example, a typical non-synchronous operation causes one rotor to make 9 revolutions versus 8 revolutions for the other rotor, i.e. a "friction ratio" of 9 to 8 or 1.125 to 1.

In U.S. Pat. No. 4,714,350 are described novel two-wing, non-intermeshing rotors of increased performance adapted for either non-synchronous or synchronous operation. Thus, those two-wing rotors may be retrofitted into existing non-synchronous internal batch mixers which currently comprise the overwhelming majority of batch mixers and also may be employed to advantage in synchronous batch mixers.

In U.S. patent application Ser. No. 918,155, filed Oct. 14, 1986, now U.S. Pat. No. 4,744,668, issued May 17, 1988, in my name as inventor, are described novel four-wing and three-wing rotors of increased performance adapted for use in either the currently more numerous non-synchronous batch mixers or synchronous bach mixers.

In both U.S. Pat. No. 4,714,350 and in the patent application, there is a recognition that optimum or preferred results are achieved by driving the specified rotors synchronously while oriented in a preferred phase angle relationship. The patent specifies that preferred phase angle relationship as being about 180°. Further experimentation and testing has confirmed that synchronous operation at a phase angle relation of 180° is indeed an optimum operating procedure for non-intermeshing internal batch mixers, and the present novel rotors have been conceived and developed to yield optimum results for rubber and plastic mixing in internal batch mixing machines driven synchronously at the optimum phase angle of 180°. In view of the fact that the vast majority of internal batch mixers in commercial usage are now driven non-synchronously, this invention indicates that retrofitting such machines for synchronous operation is likely to be rewarding in many instances.

SUMMARY OF THE INVENTION

The present invention provides optimized four-wing, non-intermeshing rotors adapted for synchronous drive at optimum phase relation in internal batch mixing machines, this optimum phase relation being a phase angle of 180°, as explained in detail later.

Among the advantages of the present invention are those resulting from the fact that the rotors are individually balanced. Thus, vibration of the internal batch mixing machine is minimized throughout the mixing cycle.

Another advantage of these optimized rotors is that the average shear strain rate along the axial length of the mixer being exerted on the materials being mixed is the same for each rotor as well as for both rotors. This attaining of the same average shear strain rate across the axial length of each rotor provides for advantageous uniform shearing action on the materials in each cavity of the mixing chamber and contributes to efficient mixing.

In the present optimized four-wing rotors, there are two long wings and two short wings on each rotor. A first long wing and a first short wing originate at a first end of each rotor, and a second long wing and a second short wing originate at the second end of each rotor, and the helix angle A is the same for all wings on both rotors. This helix angle A has a value in the range from about 10° to about 50°.

The axial length $l_1$ is the same for all long wings. Also, the axial length $l_2$ is the same for all short wings.

Each rotor has a transition zone opening between the termination of a short wing and the termination of the next succeeding long wing relative to the direction of rotation, the next succeeding long wing originating at the opposite end of the rotor from the short wing. Thus, there are two transition zone openings on each rotor, and all four of the transition zone openings are the same, that is: $Q_1 = Q_2 = Q_3 = Q_4$.

The axial and rotational forces are the same for all the long wings. Also, the axial and rotational forces are the same for all the short wings. The axial forces on each rotor are balanced as well as the rotational and axial forces of both rotors.

BRIEF DESCRIPTION OF THE DRAWINGS

The above-described and other features, objects, aspects and advantages of the present invention will become more fully understood and appreciated from the following detailed description and the appended claims, considered in conjunction with the accompanying drawings which show by way of example preferred embodiments of the present invention in contrast with certain typical rotor structures of the prior art. The same reference numbers and letters are used to indicate corresponding elements and features throughout the various views.

FIGS. 5 and 5A are schematic views similar to FIG. 3 plus FIG. 4 for purposes of explaining and showing that the axial forces and rotational forces on each rotor are balanced.

FIG. 6A is an enlarged plan view of two four-wing rotors embodying the invention. FIG. 6A is similar to FIG. 3, and additionally includes reference letters showing the helix angles "A" and the transition zone openings "Q".

FIG. 6B is a Table showing the average shear strain rate in material being mixed with prior art rotors wherein the helix angles are not equal and the transition zone openings are not equal.

FIG. 6C is a Table showing the average shear strain rate in material being mixed with the present rotors in which all of the helix angles are equal and the four transition zone openings "Q" are all equal.

FIG. 7 is an enlarged plan view of two rotors embodying the invention, being identical to FIG. 6A.

FIGS. 7A, 7B, 7C, 7D and 7E are cross-sectional views taken perpendicular to the rotor axes along planes E, D, C, B and A, respectively, in FIG. 7.

FIGS. 9A, 9B and 9C are three plan views of a pair of rotors. FIG. 9C shows two rotors embodying the invention. FIG. 9B shows a pair of rotors similar to those in FIG. 9C, except that the helix angles of the long wing and the short wing originating at one end of the rotor differ by 4° from the helix angles of the two wings originating at the other end of the rotor. FIG. 9A shows a pair of rotors similar to those in FIG. 9C, except that the helix angles of the long wing and the short wing originating at one end of the rotor differ by 8° from the helix angles of the two wings originating at the other end of the rotor.

FIG. 10 is a plot of the results of testing the rotors of FIGS. 9A and 9B and the projected results of testing the rotors of FIG. 9C.

DETAILED DESCRIPTION

Figure 1:
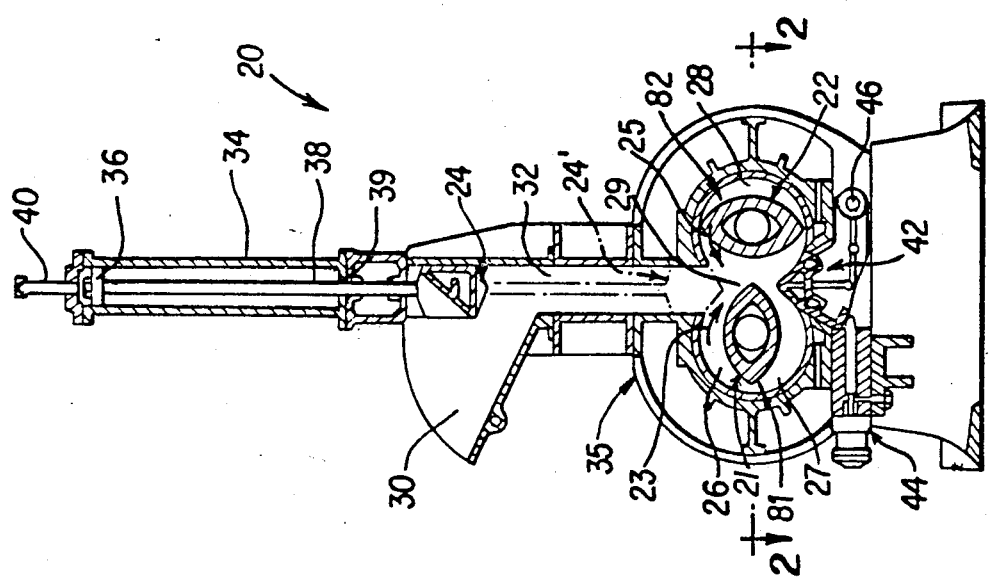
FIG. 1 is an end elevational view of an internal batch mixing machine of the non-intermeshing rotor type described embodying the present invention. Portions of the mixing machine in FIG. 1 are shown in section.

As shown in FIG. 1, a high intensity internal mixing machine of the batch type, generally indicated at 20, in which a pair of non-intermeshing rotors 21 and 22 embodying the present invention can be used to advantage includes a vertically reciprocatable ram 24 movable between a raised position shown in FIG. 1 and a lowered operating position 24' shown in dashed outline. This ram 24 is used to move ingredients to be mixed down into a mixing chamber 26. In its operating position 24', it opposes the forces exerted by materials in the mixing chamber 26 as they are being thoroughly and intensely mixed by the wings to be described later on the two counter-rotating rotors 21 and 22, which are turned about spaced parallel horizontal axes, as shown by arrows 23 and 25. The left rotor 21 as seen in FIG. 1, is turned in a clockwise direction about its axis and the right rotor 22 in a counterclockwise direction. The mixing chamber 26 is shaped to accommodate these two rotors and includes left and right chamber cavities 27 and 28 each of generally circular cylindrical shape. These chamber cavities are positioned in horizontally opposed relationship open toward each other. There is a central region 29 of the mixing chamber 26 which is defined as being located generally between the two rotors 21 and 22.

The ingredients to be mixed are initially introduced into a hopper 30, while the ram 24 is raised, so that the ingredients can enter a chute 32 communicating with the hopper 30 and leading down into the central region 2 of the mixing chamber 26. Then the ram is lowered to push the ingredients down into the mixing chamber and to retain them therein. This ram is shown being operated by a fluid-actuated drive cylinder 34, mounted at the top of the overall housing 35 of the mixing machine 20. The fluid cylinder 34, which may be hydraulic or pneumatic, contains a double-acting piston 36 with a piston rod 38 connected to the ram 24 for lowering and raising the ram. The ram is secured to the lower end of the piston rod 38 below the bottom end 39 of the cylinder 34. Actuating fluid under the desired pressure is fed through a supply line 40 into the upper portion of the cylinder 34 for urging the piston 36 downwardly to the lowered operating position 24'. After the mixing operation has been completed, the ram is retracted back up to its raised position by actuating fluid fed into the cylinder 34 below the piston 36 through a supply line not seen in FIG. 1.

The mixed and homogenized materials are discharged from the bottom of the mixing chamber 26 through a discharge opening normally closed by a door 42 which is held in its closed position during mixing operation by a locking mechanism 44. The door 42 when released by the locking mechanism 44 is swung down around a hinge shaft 46. The door is swung, for example, by a pair of hydraulic torque motors, not shown, mounted on opposite ends of the hinge shaft 46.

Figure 2:
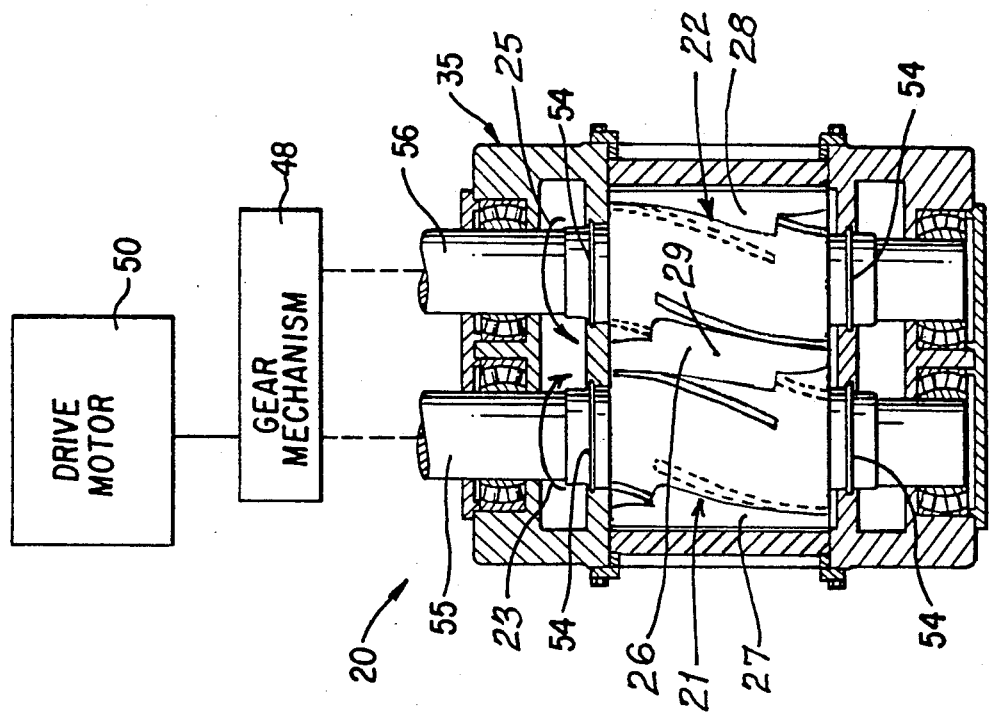
FIG. 2 is an enlarged plan sectional view taken along the line 2—2 in FIG. 1 through the mixing chamber.

FIG. 2 is a plan sectional view of the mixing mechanism 20 of FIG. 1 taken along the line 2—2. The rotors 21 and 22 are rotated in opposite directions 23, 25 by a gear mechanism 48 which is driven by a drive motor 50. This gear mechanism 48 comprises identical meshing gears for driving the rotors at the same, namely synchronous, speed. The drive motor 50 may be of conventional configuration and preferably includes speed control means for varying the speed of rotation for the rotors, as desired, depending upon the particular ingredients in the mixing chamber 26 and their temperature and viscous state, and depending upon the desired rate of mixing power to be delivered by the rotors.

There are conventional sealing collars 54 (FIG. 2) located immediately adjacent to each end of each rotor for sealing the mixing chamber 26. The ends of the rotors adjacent to the respective collars 54 are often called the "collar end", as will be shown in FIG. 3.

Further detailed information concerning the construction for such a high intensity internal batch mixing machine 20 is set forth in the above-mentioned U.S. Pat. No. 3,610,585, incorporated herein by reference.

Figure 3:
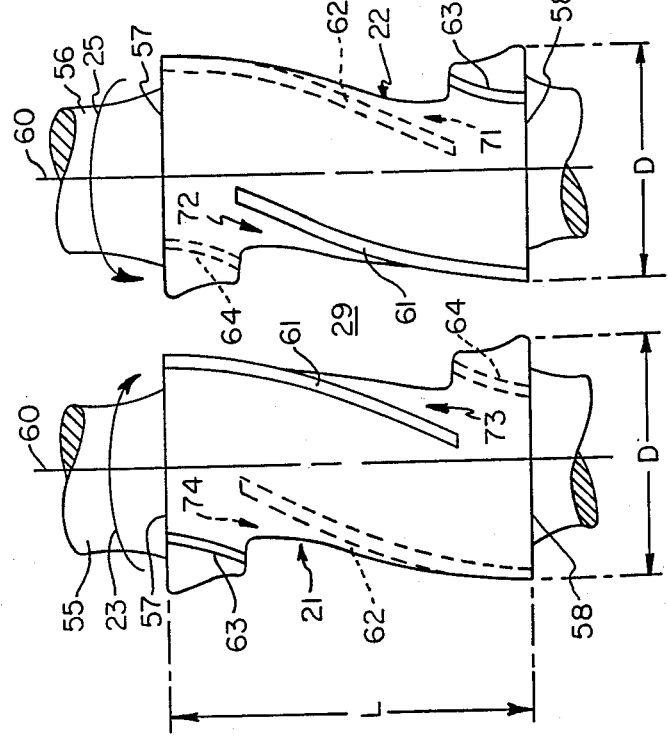
FIG. 3 is an enlarged plan view of two four-wing rotors embodying the present invention.

In FIG. 3, the left and right rotors 21 and 22 are shown each having a length "L" measured between their respective collar ends 57 and 58. The collar end 57 connected to the drive shaft 55 or 56 is the "driven end" of the rotor, the other collar end 58 being the "coolant end" or "water end". The rotors contain coolant passageways, and coolant which is usually water is fed into these passageways at the opposite ends from the location of the drive shafts 55 and 56. The rotor envelopes each have a diameter "D". Thus, the unwrapped length of each rotor envelope is "$\pi D$", as shown in FIG. 4.

The rotor 21 and 22 has its two long wings 61 and 62 originating from the opposite collar ends. The term "originating from" or similar language signifies that the leading end of the respective helical wing tip 61, 62, 63 or 64 is located at the designated collar end. The rotor axis is indicated at 60, and the angular positions 0°, 90°, 180°, 270° and 360° of the unwrapped rotor envelope are angular positions about the rotor axis. The 0° or 360° angular position is defined for convenience of explanation with reference to FIGS. 3 and 4, as being that position on the rotor envelope adjacent to the central region 29 and lying on a horizontal plane containing the two rotor axes 60.

Figure 4:
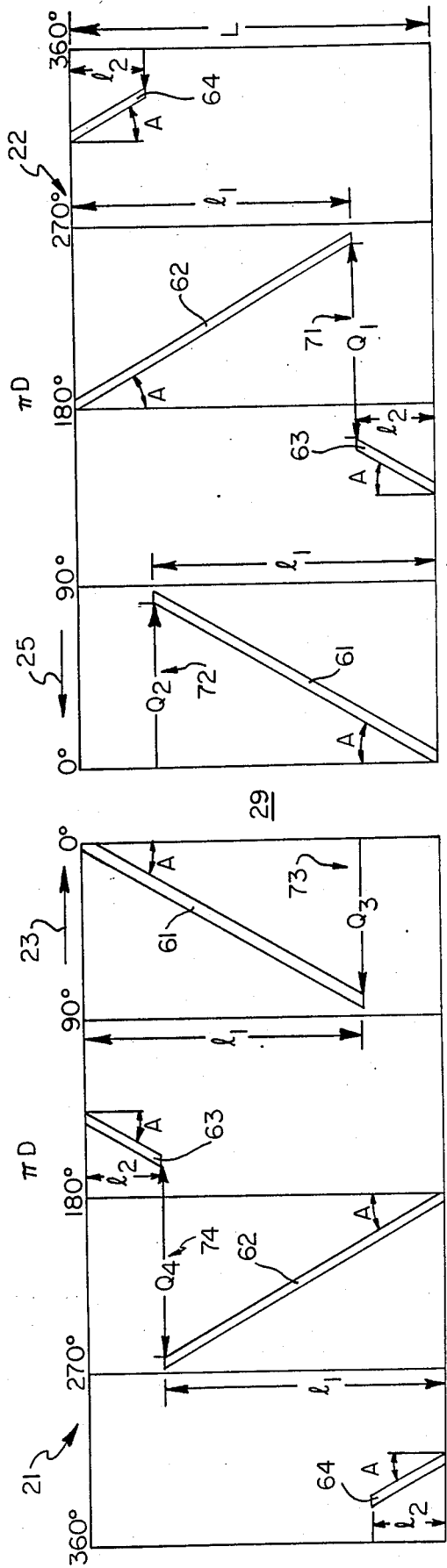
FIG. 4 shows the unwrapped envelopes of the two rotors of FIG. 3 illustrating the unwrapped helical wing tips of the four rotor wings. When the rotor envelope is unwrapped, the helical wing tips appear as straight and diagonally oriented.

The long rotor wing tips 61 and 62 originate at angular positions which are 180° apart as shown in FIG. 4, and the helix angles A of the two long rotor wing tips are the same, being an angle in the range from 10° to 50°. The short rotor wing tips 63 and 64 originate at angular positions 135° and 315°, namely, the short wings originate at angular positions 135° behind the long wing which originates at the same end of the rotor. The term "helix angle" means the orientation of the wing tips with respect to the rotor axis 60 or more precisely with respect to a plane containing the rotor axis and intersecting with the wing tip. The axial length $l_1$ of the long wings 61 and 62 is the same, and the axial length $l_2$ of the two short wings 63 and 64 is the same. The sum of $l_1$ and $l_2$ is about equal to the axial length "L" of the rotor. Thus, the terminating end of the first short wing 63 is located at about the same axial position as the terminating end of the second long wing 62. In other words, the terminating end of the first short wing 63 is about circumferentially aligned with the terminating end of the second long wing 62 as indicated by the circumferential arrow $Q_1$ for the right rotor 22 and by the circumferential arrow $Q_4$ for the left rotor 21. Similarly, the terminating end of the second short wing 64 is located at about the same axial position as the terminating end of the first long wing 61. Consequently, the terminating end of the second short wing 64 is about circumferentially aligned with the terminating end of the first long wing 61, as indicated by the circumferential arrow $Q_2$ for the right rotor 22 and by the circumferential arrow $Q_3$ for the left rotor 21.

These circumferential spacings $Q_1$, $Q_2$, $Q_3$ and $Q_4$ of the terminating ends of short wings and long wings originating at opposite ends of rotor are all equal. These equal spacings $Q_1$, $Q_2$, $Q_3$ and $Q_4$ define novel transition zone openings 71, 72, 73 and 74 which are equal and allow the material being mixed to flow freely and symmetrically through the respective transition zone opening.

The transition zone opening 71 ($Q_1$) is located between 15% and 30% of the rotor length L from the coolant end 58. Similarly, the other transition zone openings 72 ($Q_2$) is located between 15% and 30% of the rotor length L from the driven end 57, i.e. at a position between 85% and 70% of the rotor length from the coolant end 58. On the other rotor the transition zone openings 73 ($Q_3$) and 74($Q_4$) are also positioned respectively, at locations between 15% and 30% of L and 85% and 70% of L from the coolant end 58. The long wings on each rotor have an axial length between 0.70L and 0.85L.

In FIG. 4 the two rotors are being driven synchronously as shown by arrows 23 and 25 while oriented at a constant 180° phase relation one to the other as is shown. In order to explain this 180° phase relation, it is noted that the 180° position on the right rotor is the mirror image of the zero degree position on the left rotor. Thus, the right rotor is oriented 180° away from being in phase with the left rotor, and consequently the rotors are in a 180° phase relationship with respect to each other.

Inviting attention to the schematic explanatory illustration FIG. 5, this analysis has the underlying assumption that the interaction effects between the two synchronously turning rotors are neglected. It is to be noted that the axial and rotational forces F1A and F1R exerted on the material being mixed are the same for all of the long wings. Moreover, the axial and rotational forces F2A and F2R are the same for all of the short wings. Thus, advantageously, the summation of axial forces for the wings of the left rotor 21 is:

$$FA = F1A - F1A + F2A - F2A = 0 \tag{1}$$

which means that the axial forces on the left rotor are balanced.

The summation of rotational forces for the wings of the left rotor 21 is:

$$FR = 2F1R + 2F2R \tag{2}$$

The summation of axial forces for the wings of the right rotor 22 is:

$$FA = F1A - F1A + F2A - F2A = 0 \tag{3}$$

showing that the axial forces on the right rotor are balanced.

The summation of rotational forces for the wings of the right rotor 22 is:

$$FR = -2F1R - 2F2R \tag{4}$$

The summation of the axial forces for both rotors is:

$$FA = 0 + 0 = 0 \tag{5}$$

indicating that the axial forces are balanced for both rotors. The individual balancing of the axial forces on each rotor as well as balancing the axial forces for both rotors minimizes vibration and stress in the machine 20 during a mixing cycle.

The summation of the rotational forces for both rotors is:

$$FR = 2F1R + 2F2R - 2F1R - 2F2R = 0 \quad (6)$$

showing that the rotational forces for both rotors are balanced in the mixing chamber, enabling the machine 20 to run smoothly during a mixing cycle.

The table in FIG. 6B for prior art rotors, wherein the helix angles of various wings are not the same and wherein the transition zone openings on each rotor are not equal, shows that the average shear strain rate in material being mixed differs along the various sections of the rotors individually.

In the table in FIG. 6C for the present optimized rotors, wherein all helix angles are the same and all transition openings Q are the same, the average shear strain rate in material being mixed is uniformly the same along the various sections of the rotors individually.

The cross sections of FIGS. 7A, 7B, 7C, 7D and 7E (Sections E—E, D—D, C—C, B—B and A—A, respectively) dramatically illustrate the novel configuration of these two rotors. The passages 76 inside of the rotors are located near the respective wing tips serving as coolant passages through which liquid coolant, usually water, is circulated. These coolant passages 76 are arcuate in cross section for providing a substantially uniform rotor wall thickness 78 between the working surfaces of the rotor and the coolant passages 76. Moreover, these arcuate coolant passages are offset from the nearby wing tip in the direction toward which the rotor is turning, because the leading surface of each wing tip is performing the major amount of work on the material being mixed as compared with the trailing surface of each wing tip.

The D sections are taken at an axial position located between 15% and 30% of the rotor axial length L from the driven collar ends 57 of the respective rotors. Likewise, the B sections are taken at an axial position located between 15% and 30% of the rotor length L from the coolant ends 58 of the respective rotors. Thus, these sections D and B include the four equal transition zone openings $Q_2$, $Q_4$ and $Q_1$ and $Q_3$ respectively.

As seen in FIG. 4, the respective short wings terminate generally in circumferential alignment with the termination of the respective long wings which originate from the respective opposite end of the rotor, thereby defining the four equal transition zone openings $Q_1$, $Q_2$, $Q_3$, and $Q_4$ Consequently, in the two sections D and in the two sections B, which include these four equal transition zone openings, there is a three-lobed appearance, generally configured like an equilateral triangle with rounded vertices. The leading face of each of the three rounded vertices is more rounded than the trailing face, i.e. the radii of curvature defining the leading face are shorter on average tha the radii of curvature defining the trailing face.

In the positions seen in FIGS. 7B and 7D, the transition zone opening $Q_2$ of the right rotor is opposite the long wing tip 61 of the left rotor, and the transition zone opening $Q_3$ of the left rotor is opposite the long wing tip 61 of the right rotor, while the transition zone openings $Q_1$ and $Q_4$ are facing into the respective right and left chamber cavities 28 and 27, respectively (FIG. 1).

Figure 8:
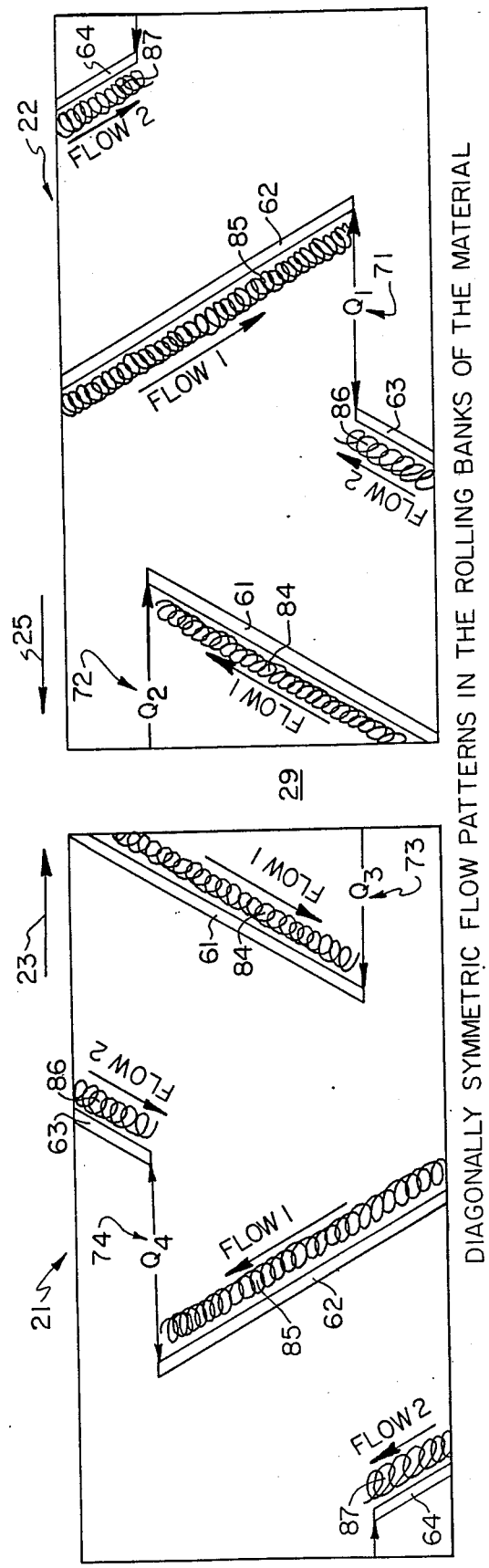
FIG. 8 shows the unwrapped envelopes of the two rotors of FIGS. 3, 5, 6A and 7, and illustrates the diagonally symmetric flow patterns in the rolling banks of material as driven by the rotor wings.

In FIG. 8, there are shown the unwrapped rotor envelopes and the diagonally symmetric flow patterns of the rolling banks of material being kneaded and mixed by the respective wings of the two rotors. Along each rotor 21 and 22, the bank of material 84 rolling and flowing along the first long wing 61 is symmetrically balanced with the diagonally opposite bank of material 85 rolling and flowing along the second long wing 62. Similarly, the bank of material 86 rolling and flowing along the first short wing 63 is symmetrically balanced with the diagonally opposite bank of material 87 rolling and flowing along the second short wing 64. The equal transition zone openings 71, 72, 73 and 74 ($Q_1$, $Q_2$, $Q_3$ and $Q_4$, respectively) facilitate this diagonally symmetric flow action which advantageously achieves a uniform mixing in a relatively short time with relatively few rotations of the two rotors.

FIG. 10 shows three plots of tensile test results of one-step mixing of a natural rubber formulation. The first plot 81 is a curve drawn through tensile test results on five different batch weights of the formulation when mixed using two four-wing rotors (FIG. 9A) which the helix angles $A_2$ of the two wings originating at one end of each rotor were 8° larger than the helix angles $A_1$ of the two wings originating at the other end of each rotor.

The second plot 82 is a curve drawn through tensile test results using the same five different batch weights when the natural rubber formulation was mixed using two four-wing rotors (FIG. 9B) wherein the helix angles $A_2$ of the two wings originating at one end of each rotor were 4° larger than the helix angles $A_1$ of the two wings originating at the other end of each rotor. The curve 82 is considerably elevated above the curve 81, particularly for the medium batch weight mixed samples.

The third plot 83 is an extrapolation or projection of the test results which are expected to result when using the optimized balanced, equal helix angle rotors of the present invention.

In a presently preferred configuration, the helix angle "A" of the four wings on each rotor 21 and 22 is in the range from about 23° to about 35°. An optimum configuration has the helix angle "A" between about 27° and about 31°.

While preferred embodiments of this invention have been described in detail, it will be understood that various modifications and alterations of the two rotors may be made without departing from the spirit and scope of the invention, as set forth in the appended claims.

What is claimed is:

1. First and second non-intermeshing four-wing rotors each of length "L" and optimized for synchronous rotation at a constant 180° phase relation between rotors in an internal batch mixing machine having synchronous drive means, each of said rotors having four wings of generally helical configuration including first and second long wings and first and second short wings, said first and second optimized non-intermeshing rotors comprising:

said first long wing on each rotor originating at a first end of the rotor at about 0° angular position relative to the rotor axis and having its wing tip oriented to the rotor axis at a helix angle "A" in the range from about 10° to about 50°;

said second long wing on each rotor originating at a second end of the rotor at about 180° angular position relative to the rotor axis and having its wing tip also oriented to the rotor axis at a helix angle equal to said helix angle "A" of the first long wing and also having the same axial length as said first long wing;

said first short wing on each rotor originating at the first end of the rotor at an angular position in the range of about 130° to about 140° relative to the rotor axis and having its wing tip oriented to the rotor axis at a helix angle equal to said helix angle "A";

said second short wing on each rotor originating at the second end of the rotor at an angular position in the range of about 310° to 320° relative to the rotor axis and also having its wing tip oriented to the rotor axis at a helix angle equal to said helix angle "A" and also having the same axial length as said first short wing;

said first and second rotors at a first axial position located between 15% and 30% of the rotor length "L" from the first end of the rotor having a cross-sectional configuration with a three-lobed appearance, generally configured like an equilateral triangle with rounded vertices, a leading face of each of the three rounded vertices being more rounded than a trailing face;

said first and second rotors at a second axial position located between 15% and 30% of the rotor length "L" from the second end of the rotor, and being located at the same distance from said second end of the rotor as said first axial position is from the first end of the rotor, having a cross-sectional configuration with a three-lobed appearance, generally configured like an equilateral triangle with rounded vertices, a leading face of each of the three rounded vertices being more rounded than a trailing face; and said first end of said first rotor being adapted to be oriented in the internal batch mixing machine with said first end of said first rotor being located opposite to said second end of said second rotor.

2. First and second non-intermeshing four-wing rotors as claimed in claim 1, in which:

said first short wing on each rotor terminates at a termination generally circumferentially aligned with the termination of said second long wing for defining a large first transition zone opening, of the same size on each rotor;

said second short wing on each rotor terminates at a termination generally circumferentially aligned with the termination of said first long wing for defining a large second transition zone opening of the same size on each rotor and of the same size a said large first transition zone openings; and said large transition zone openings being adjacent to the respective three-lobed cross-sectional configurations.

3. First and second non-intermeshing four-wing rotors as claimed in claim 2, in which:

said helix angle "A" of all four wings on each rotor is between about 23° and about 35°.

4. First and second non-intermeshing four-wing rotors as claimed in claim 3, in which:

said helix angle "A" of all four wings on each rotor is between about 27° and about 31°.

5. First and second non-intermeshing four-wing rotors as claimed in claim 2, in which:

said first and second long wings on each rotor have equal axial lengths and the axial length of the long wings is between 0.70L and 0.85L, where "L" is the axial length of the rotor.

6. First and second non-intermeshing four-wing rotors as claimed in claim 1, in which:

said helix angle "A" of all four wings on each rotor is in the range from about 23° to about 35°.

7. First and second non-intermeshing four-wing rotors as claimed in claim 6, in which:

said helix angle "A" of all four wings on each rotor is between about 27° to about 31°.

8. First and second non-intermeshing four-wing rotors as claimed in claim 1, in which:

said first and second long wings on each rotor have equal axial lengths and the axial length of the long wings is between 0.70L and 0.85L, where "L" is the axial length of the rotor.

9. First and second non-intermeshing four-wing rotors as claimed in claim 1, wherein:

coolant passages having an arcuate configuration as seen in cross-section are located within the rotor near the respective wing tips; and said coolant passages are generally uniformly spaced from the respective surfaces of a nearby wing for providing a substantially uniform rotor wall thickness between the respective coolant passage and the nearby rotor wing.

10. First and second non-intermeshing four-wing rotors as claimed in claim 9, in which:

the respective arcuate coolant passages are offset from the wing tip of the nearby wing in the direction toward which the rotor is to be rotated for cooling said leading surface of the wing more than said trailing surface.

11. First and second non-intermeshing four-wing rotors as claimed in claim 1, in which:

the sum of the axial length of a long wing on a rotor plus the axial length of short wing is about equal to "L", the axial length of the rotor.

12. First and second non-intermeshing four-wing rotors optimized for synchronous rotation at a constant 180° phase relation between rotors in an internal batch mixing machine having synchronous drive means, each of said rotors having four wings of generally helical configuration including first and second long wings and first and second short wings, said first and second optimized non-intermeshing rotors comprising:

said first long wing on each rotor originating at a first end of the rotor at about 0° angular position with respect to the rotor axis and having its wing tip oriented to the rotor axis at a helix angle A in the range from about 10° to about 50°;

said second long wing on each rotor originating at a second end of the rotor at about 180° angular position with respect to the rotor axis an having its wing tip also oriented to the rotor axis at a helix angle equal to said helix angle A of the first long wing and also having the same axial length as said first long wing;

said first short wing on each rotor originating at the first end of the rotor at about 135° angular position with respect to the rotor axis and having its wing tip oriented to the rotor axis at a helix angle equal to said helix angle A;

said second short wing on each rotor originating at the second end of the rotor at about 315° angular position with respect to the rotor axis and also having its wing tip oriented to the rotor axis at a helix angle equal to said helix angle A and also having the same axial length as said first short wing;

said first short wing on each rotor terminating at an axial position located between 15% and 30% of the rotor length L from the first end of the rotor;

said second long wing on each rotor also terminating at an axial position located between 15% and 30% of the rotor length L from the first end of the rotor and the termination of said second long wing being generally circumferentially aligned with the axial position at which said first short wing terminates for defining a first transition zone opening $Q^1$;

said first transition zone opening $Q^1$ being the same for both rotors;

said second short wing on each rotor terminating at an axial position located between 15% and 30% of the rotor length L from the second end of the rotor;

said first long wing on each rotor also terminating at an axial position located between 15% and 30% of the rotor length L from the second end of the rotor and the termination of said first long wing being generally circumferentially aligned with the axial position at which said second short wing terminates for defining a second transition zone opening $Q^2$;

said second transition zone opening $Q^2$ being the same for both rotors and also being the same as said first transition zone opening $Q^1$; and said first end of s id first rotor being adapted to be oriented in an internal batch mixing machine with said first end of said first rotor being located opposite to said second end of said second rotor.

13. First and second non-intermeshing four-wing rotors as claimed in claim 12, in which:
the sum of the axial length of a long wing on a rotor plus the axial length of a short wing is about equal to "L", the axial length of the rotor.

14. First and second non-intermeshing four-wing rotors as claimed in claim 12, in which:
said first and second rotors at said axial positions of said first and second transition zone openings having a cross-sectional configuration with a three-lobed appearance, generally configured like an equilateral triangle with rounded vertices, a leading face of each of the three rounded vertices being more rounded than a trailing face.

15. In an internal mixing machine including housing means defining a mixing chamber with respective cavities and shaped to accommodate first and second counter-rotating non-intermeshing winged rotors on parallel axes in said respective cavities, said cavities communicating in a central region of the mixing chamber located generally between said rotors, said mixing chamber having an inlet and an outlet, said machine including drive means for rotating said rotors in opposite directions around their respective axes, wherein said first and second rotors each has a driven end and a coolant end and four wings with wing tips of generally helical configuration including first and second long wings and first and second short wings, said first and second non-intermeshing rotors being characterized in that:

said first long wing on each rotor originates at a first end of the rotor at a zero angular position with respect to the rotor axis and has its wing tip oriented to the rotor axis at a first helix angle "A" in the range from about 10° to about 50°, said second long wing originates at the second end of the rotor at an angular position with respect to the rotor axis at about 180° and has its wing tip oriented to the rotor axis at a second helix angle "A" equal to said first helix angle said first short wing originates at the same end of the rotor as said first long wing, said first short wing originates at said first end of the rotor at an angular position with respect to the rotor axis at about 135° and has its wing tip oriented to the rotor axis at a third helix angle "A" equal to said first and second helix angles, and said second short wing originates at the same end of the rotor as said second long wing, said second short wing originates at said second end of the rotor at an angular position with respect to the rotor axis at about 315° and has its wing tip oriented to the rotor axis at a fourth helix angle "A" equal to said first, second and third helix angles, and each of said wings terminates at a position axially spaced from either end of the rotor, the termination of the first short wing on each rotor being circumferentially spaced from the termination of the second long wing on each rotor by a first transition zone opening "Q" which is the same for both rotors, the termination of the second short wing on each rotor being circumferentially spaced from the termination of the first long wing on each rotor by a second transition zone opening "Q" which is the same for both rotors, and all four of said transition zone openings "Q" are equal, and said first end of said first rotor is the driven end which is driven by said drive means, and said second end of said second rotor is the driven end which is driven by said drive means; and said drive means turns said rotors synchronously about their respective axes with said rotors being oriented at a 180° phase relationship relative to each other.

16. First and second non-intermeshing four-wing rotors as claimed in claim 15, in which:
said first and second rotors at axial positions where said first and second transition zone openings "Q" are located have a cross-section configuration with a three-lobed appearance, generally configured like an equilateral triangle with rounded vertices, a leading face of each of the three rounded vertices being more rounded than a trailing face;

the more rounded leading face geerally having shorter radii of curvature on average than the trailing face.

* * * * *